Aug. 3, 1971  H. W. LA BRANCHE  3,597,279
TOY WITH BATTERY HOLDER
Filed March 24, 1969
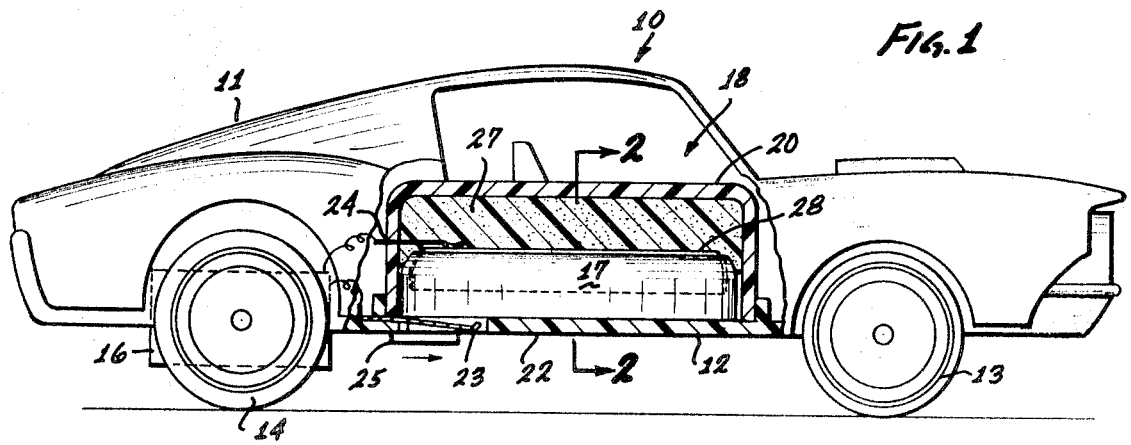
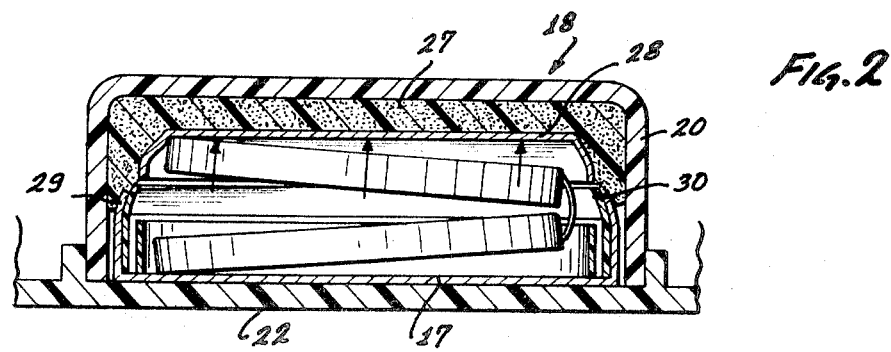
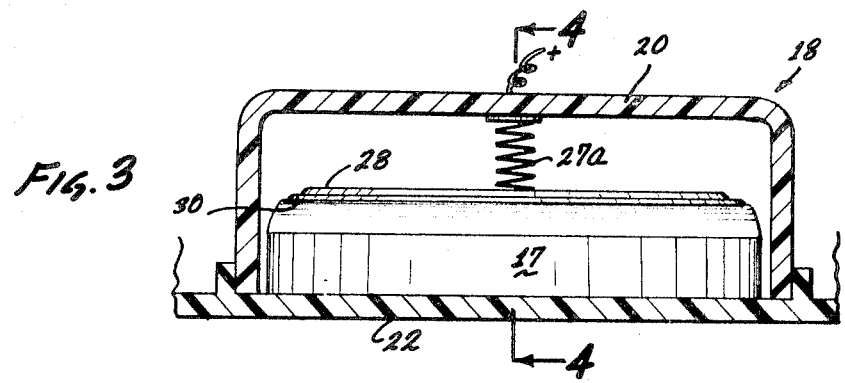
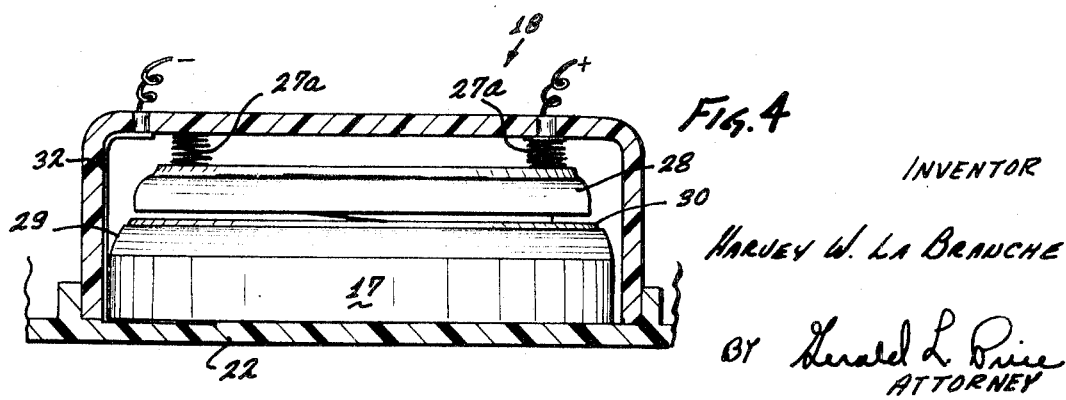
INVENTOR
HARVEY W. LA BRANCHE
BY Gerald L. Price
ATTORNEY United States Patent Office 3,597,279
Patented Aug. 3, 1971

3,597,279
TOY WITH BATTERY HOLDER
Harvey W. La Branche, Palos Verdes Peninsula, Calif.,
assignor to Mattel, Inc., Hawthorne, Calif.
Filed Mar. 24, 1969, Ser. No. 809,855
Int. Cl. H01m 1/04
U.S. Cl. 136—173
8 Claims

ABSTRACT OF THE DISCLOSURE

In an electric toy, game, novelty or amusement device utilizing a miniature self-contained rechargeable or extended life battery or cell as its source of power, an energy absorbing material is disposed adjacent to the battery or cell to prevent damage to the device or access to the electrolyte in the event of a swelling or separating of the battery or cell.

BACKGROUND OF THE INVENTION

The present invention relates generally to battery energized devices and in particular to small electrical toys, games and other novelty and amusement devices that derive their power from self-contained rechargeable electrical current producing cells.

In recent years, miniature rechargeable batteries have begun to be utilized in an ever increasing number of consumer electric and electronic products such as electric razors, hearing aids, flashlights and toys. While many different types of small rechargeable and extended life batteries have been developed by the battery industry for these and other products, the most widely used cells employ a similar construction in that they comprise a metal container hermetically sealed with a metal cap. The seal is a non-conductive material and the container and cap constitute the respective terminals of the cell.

A major difficulty in the use of small rechargeable batteries and cells is that as they approach a fully charged condition, the further application of a charging current produces an excessive gaseous pressure within the cell resulting in the swelling of the cell or even a complete rupture of the seal thus forcibly separating the cap from the container. A similar swelling or destruction can also occur when a battery or cell is subjected to a current of reverse polarity.

The problem of battery and cells swelling and separating becomes particularly important when they are being used in an extremely compact device since in addition to very likely damaging the device, a separated cell may become exposed. This exposure is particularly undesirable in devices used by children as the electrolyte used in these cells is often in the form of a caustic paste or solution.

While cells are presently available which are provided with vents or other means to prevent swelling and sophisticated charging circuits have been developed which reduce their output when a cell being charged approaches its fully charged condition, both of these approaches are considerably more expensive than conventional rechargeable and extended life cells and charging circuits, thus precluding their use in conjunction with low priced electric and electronic toys, games, novelties and amusement devices.

SUMMARY OF THE INVENTION

Accordingly, it is the general aim of the present invention to provide a conventional miniature rechargeable or extended life battery or cell within a compact toy, game, novelty or amusement device as a source of electric current which will not damage or destroy the device should it swell or separate due to excessive internal gaseous pressure.

A further object of this invention is to provide a compact toy, game, novelty or amusement device with a conventional self-contained rechargeable or extended life battery in the manner referred to, yet which is economical and permits ease in assembly of the device.

A correlative object of the present invention is to contain the swelling or separating of a rechargeable or extended life battery or cell within the toy, game, novelty or amusement device it is mounted in. As a result of attaining this objective, the outer shell or housing of the device will remain intact preventing undesired access to the damaged battery or cell.

BRIEF DESCRIPTION OF THE DRAWINGS

These and further objects and advantages of the present invention will become apparent from the following descriptions, taken in conjunction with the accompanying drawings in which:

FIG. 1 is a side view partially in section of an exemplary apparatus embodying the feature of the present invention here depicting an electrically powered toy car with a self-contained rechargeable or extended life cell;

FIG. 2 is an enlarged sectional view taken substantially along the line 2—2 of FIG. 1, and depicting the cell in a separated condition;

FIG. 3 is an enlarged side view partially in section similar to that portion of FIG. 1 shown in section but here depicting a modified form of carrying out the present invention; and FIG. 4 is a side view partially in section taken substantially along the line 4—4 of FIG. 3, and depicting the cell in a separated condition.

While particular embodiments of the present invention are shown in the drawings and will herein be described in detail, it is apparent that changes and modifications may be made without departing from this invention in its broader aspects, and therefore the aim in the appended claims is to cover such changes and modifications as fall within the true spirit and scope of this invention.

DESCRIPTION OF THE EXEMPLARY EMBODIMENTS

Referring now to FIG. 1, an exemplary device in the form of a miniature electrically powered toy automobile generally indicated at 10, is illustrated, the automobile including a body 11, a chassis 12 which carries a pair of front wheels 13 and rear wheels 14, the latter being driven by electric motor 16. In the exemplary device, the motor 16 is powered by a rechargeable nickel cadmium cell 17 of the "button" type. As depicted in section in FIG. 1, the cell 17 is mounted in a housing generally indicated at 18 which includes a case 20 and cover 22. The cover 22 is depicted as being a part of the chassis 12 and thus access to the cell 17 would be obtained by first removing the chassis 12 from the body 11 by the particular fastening employed and then removing the case 20. While the above arrangement is shown for convenience of illustration, it is understood that the housing 18 may be provided in various other forms such as for example the case 20 being integral with the body 11, a separate cover 22 is provided in the chassis 12 for access to the cell 17, or the entire housing 20 being permanently sealed, without departing from the spirit and scope of the present invention. In order to energize the motor 16, contacts 23 and 24 are provided which engage the respective terminals of the cell 17 and are connected to the motor 16. A switch such as a slidable button 25 allowing contact 23 to be selectively engageable with a terminal of cell 17 may also be provided if such control is desired.

In accordance with one of the important aspects of the present invention, provision is made to contain the possible swelling or separating of cell 17 so that the device that it is installed in will not be damaged or destroyed. As can readily be appreciated, a swelling or separating of the cell 17 in a small device such as the exemplary miniature toy auto 10 (FIG. 1) could damage or destroy the internal mechanism as well as the outer structure. To accomplish this aim, energy absorbing material is disposed adjacent to the cell 17 in a suitably sized space provided therefor. The energy absorbing material and the space therefor is selected and sized so that upon a swelling or separating of the cell 17, a substantial portion of the energy released therefrom would be consumed by the energy absorbing material thus substantially reducing or completely eliminating the pressure that the swelling or separating cell 17 would normally have exerted against the device it is installed in. While a large number of both rigid and resilient energy absorbing materials such as felt, Styrofoam, rubber or the like can be employed in practicing the present invention, it has been found that cellular elastomeric material such as polyurethene plastic, for example, produces desirable results, in the confined spaces where the present invention would be of particular value.

In the miniature toy automobile 10 (FIG. 1) the energy absorbing material is provided in the form of an insert 27 of elastomeric cellular material disposed between the cap 28 of the cell 17 and the top of the battery housing case 20. As seen in FIG. 2, when the condition where excessive gaseous pressure develops within the cell 17 to an extent that the seal 30 fails and the cap 28 is forcibly separated from the container 29, the insert 27 will be compressed by the upward movement of the cap 28. It will be readily appreciated that the energy required to compress the insert 27 is obtained from the force exerted on the insert 27 by the cap 28 of the cell 17 as it swells or separates and therefore if the insert 27 and its associated space is properly chosen as to compressability and size, the entire force will be expended in compressing the insert 27 within said space.

In keeping with another important object of the present invention, it will be readily appreciated that when the insert 27 is compressed by a cell 17 in the condition depicted in FIG. 2, the insert 27 also seals the opening between the cap 28 and the container 29 of the cell 17 thereby preventing the possible spillage of electrolyte and any ensuing damage to the device, or injury to a person or animal that may come in contact with it.

While in the illustrated embodiment of the invention the energy absorbing material is disposed adjacent to the cap 28 of the cell 17, this arrangement is depicted primarily for purposes of explanation and ease of assembly of the toy automobile 10. The present invention contemplates that energy absorbing material could also be disposed adjacent to the bottom of the container 29 or to both the cap 28 and the bottom of the container 29 in addition to any other arrangement that would be dictated by the size, characteristic, quantity and arrangement of the batteries or cells employed in a particular device. It should also be pointed out that in certain instances it may be desirable to eliminate the housing 18 and to solely utilize portions of the particular device such as for example, the body 11 and the chassis 12 of the toy automobile 10 for the enclosure for the battery or cell and the energy absorbing material.

In FIG. 3, there is shown a modified type of battery or cell mounting which is similar in overall construction and operation to the battery or cell housing 18 described above and which also embodies the present invention. In view of the similarity between these two exemplary fixtures like parts in both fixtures will be designated by identical reference numerals and those parts not common to the two fixtures will be designated by different reference numerals.

In the modified type of battery or cell mounting depicted in FIG. 3, a pair of springs 27a are employed as the energy absorbing material. Since springs are obtainable or can be fabricated in a large array of shapes, sizes and resistances, the mounting and containment of a battery or cell in keeping with the present invention can in many applications be readily obtained by their use. Referring to FIG. 4 where the cell 17 is depicted in separated condition, with the energy released by same having been substantially absorbed by the pair of springs 27a. Spring 27a can also be utilized as a contact as illustrated in FIG. 4, the other contact being a current conducting clip 32 extending to the lower terminal of the cell 17 (FIG. 4). The case 20 of the housing 18 would of course have to be of a non-conducting material for this arrangement to function. An alternate method (not shown) would be for the cover 22 to serve as a contact and employ the entire chassis 12 of the toy automobile 10 as a conductor. In addition, it is well within the spirit and scope of the present invention to mount the cell 17 with springs above and below (not shown) thus freely suspending the cell 17 and spacing it from any portion of the device it is mounted in, yet still maintaining it in a desired position therein. While it is recognized that flashlights and other cell and battery containing devices incorporate a spring as a contact and to retain the cells or batteries in a desired position, it is pointed out that the prior uses of same have not contemplated the swelling or separating of a cell or battery and accordingly the resiliency and configuration of the spring or the size of its associated space in prior art devices would not insure that damage or destruction would not take place.

In the practice of the present invention with an energy absorbing material having resilient properties, it has been found desirable to preload or compress the material slightly in its normal position so that a slight force will always be exerted on the battery or cell to offer some resistance to initial swelling. This force can also be utilized in maintaining the battery or cell in a desired position within a device without the need for a clip or bracket, thus resulting a reduction in weight and cost.

What is claimed is:

1. A toy vehicle of the type utilizing a source of electrical current and deriving said source current from a self-contained current producing battery or cell, comprising:
   a toy vehicle having a completely closed battery compartment;
   a battery or cell housed in said battery compartment; and
   means for containing any swelling or separation of said battery or cell disposed in said compartment between said compartment and said battery or cell and in engagement with both to thereby prevent damage to said amustment device and its user.

2. The invention as set forth in claim 1 wherein said means comprises resilient means.

3. The invention as set forth in claim 2 wherein said resilient means comprises cellular elastomeric material.

4. The invention as set forth in claim 1 wherein said means comprises a rigid material.

5. The invention as set forth in claim 2 wherein said resilient means comprises at least one spring.

6. The invention as set forth in claim 1 wherein said means additionally maintains said battery or cell in the intended position therefore in said device.

7. The invention as set forth in claim 2 wherein said resilient means is disposed immediately adjacent said battery or cell and in a partially compressed condition thereby continuously applying a force to said battery or cell in a manner so as to resist the swelling or separation thereof.

8. The invention as set forth in claim 1 wherein the containment of said swelling or separation by said means will prohibit direct access to the electrolyte in said battery or cell.

References Cited

UNITED STATES PATENTS

| | | | |
|---|---|---|---|
| 2,346,695 | 4/1944 | Miller | 136—173UX |
| 2,606,941 | 8/1952 | Ruben | 136—111 |
| 3,042,733 | 7/1962 | Toda et al. | 136—173X |
| 3,064,069 | 11/1962 | Auge | 136—173 |
| 3,095,483 | 6/1963 | Tresise et al. | 136—173UX |

FOREIGN PATENTS

| | | | |
|---|---|---|---|
| 1,012,686 | 7/1952 | France | 136—132 |

DONALD L. WALTON, Primary Examiner

U.S. Cl. X.R.

46—243